United States Patent [19]
Smydra et al.

[11] Patent Number: 5,609,355
[45] Date of Patent: Mar. 11, 1997

[54] DEPLOYMENT APPARATUS FOR AN INFLATABLE VEHICLE OCCUPANT RESTRAINT

[75] Inventors: Andrew J. Smydra, Rochester; Rodger M. Cherry, Macomb Township; Scott A. Kelley, Algonac, all of Mich.

[73] Assignee: TRW Vehicle Safety Systems Inc., Lyndhurst, Ohio

[21] Appl. No.: 510,110

[22] Filed: Aug. 1, 1995

[51] Int. Cl.$^6$ .................................................. B60R 21/16
[52] U.S. Cl. .................................... 280/728.3; 280/732
[58] Field of Search ........................ 280/728.2, 728.3, 280/731, 732

[56] References Cited

U.S. PATENT DOCUMENTS

| | | |
|---|---|---|
| 5,031,930 | 7/1991 | Sato . |
| 5,060,972 | 10/1991 | Satoh et al. . |
| 5,217,254 | 6/1993 | Satoh . |
| 5,299,827 | 4/1994 | Igawa . |
| 5,316,334 | 5/1994 | Skidmore . |
| 5,335,939 | 8/1994 | Kuriyama et al. . |
| 5,348,339 | 9/1994 | Turner . |
| 5,358,271 | 10/1994 | Watanabe et al. . |
| 5,366,240 | 11/1994 | Hanabusa et al. . |
| 5,374,079 | 12/1994 | Dukeshire et al. . |
| 5,527,065 | 6/1996 | Saberan et al. ............... 280/728.3 |

FOREIGN PATENT DOCUMENTS 2265119  9/1993  United Kingdom .

*Primary Examiner*—Paul N. Dickson
*Attorney, Agent, or Firm*—Tarolli, Sundheim, Covell, Tummino & Szabo

[57] ABSTRACT

A deployment apparatus for use with an inflatable vehicle occupant restraint, such as an air bag (18), includes a pivotal door panel (80). The apparatus further includes three couplings (124, 126, and 128) which secure the door panel (80) in a closed position by blocking pivotal movement of the door panel (80). The couplings (124, 126, and 128) include rigid members (118, 120, and 122) which rupture a rupturable member (84) upon relative movement of those members under the influence of the inflating air bag (18). The couplings (124, 126, and 128) are opened so as to release the door panel (80) for pivotal movement upon such rupturing by the rigid members (118, 120, and 122). One of the couplings (124) is located near the middle of the door panel (80). The other couplings (126 and 128) are located closer to the opposite ends of the door panel (80). The coupling (124) near the middle of the door panel (80) is opened before the other couplings (126 and 128) are opened. The couplings (124, 126, and 128) thus release the door panel (80) near the middle of the door panel (80) before releasing the door panel (80) near its opposite ends.

18 Claims, 6 Drawing Sheets

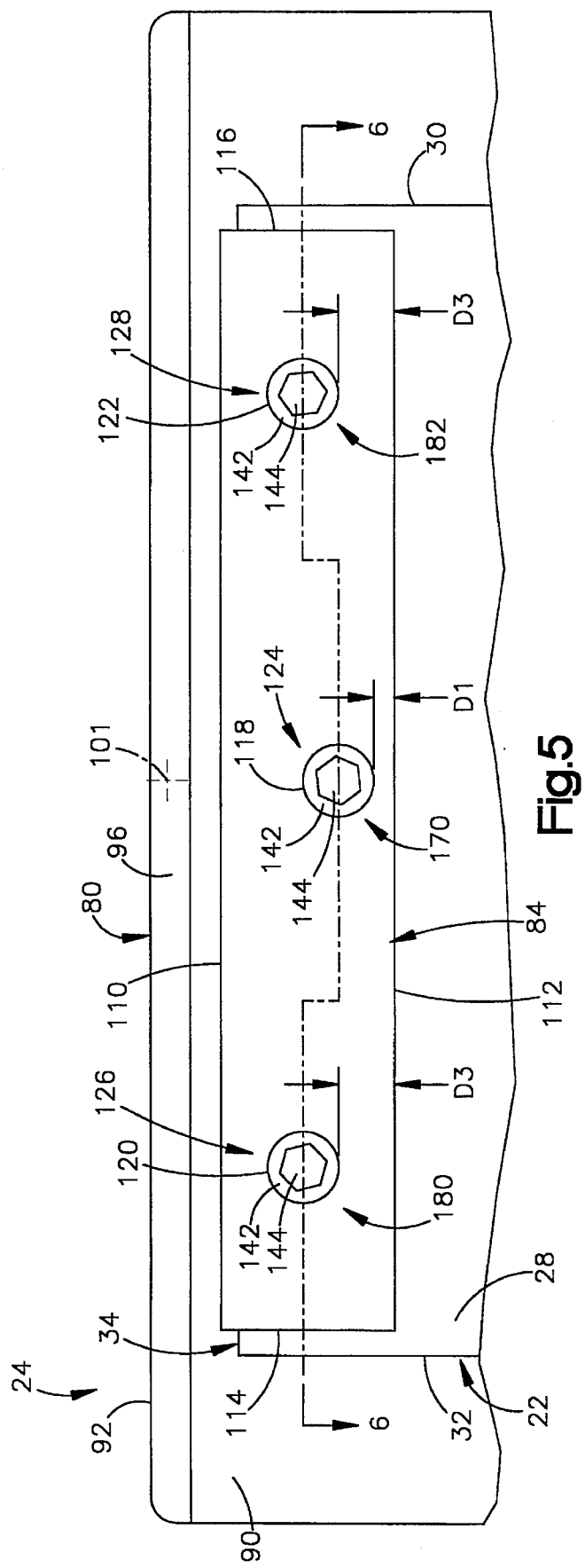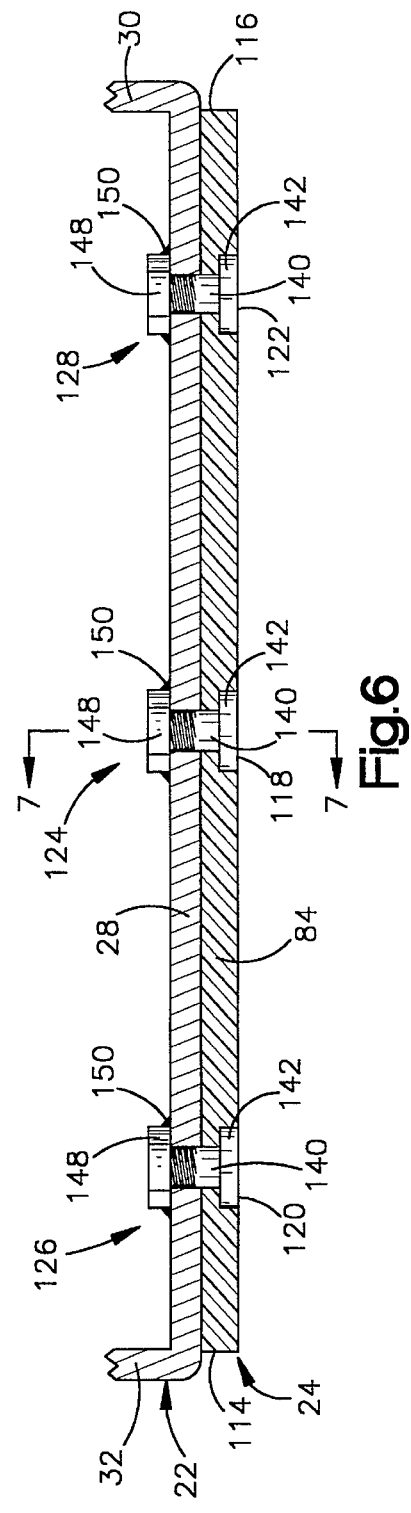

DEPLOYMENT APPARATUS FOR AN INFLATABLE VEHICLE OCCUPANT RESTRAINT

FIELD OF THE INVENTION

The present invention relates to a deployment apparatus for use with an inflatable vehicle occupant restraint, and particularly relates to a deployment apparatus including a deployment door which is opened upon inflation of the restraint.

BACKGROUND OF THE INVENTION

An inflatable vehicle occupant restraint, such as an air bag, is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag to inflate the air bag into the vehicle occupant compartment. When the air bag is inflated into the vehicle occupant compartment, it restrains an occupant of the vehicle from forcefully striking parts of the vehicle as a result of the collision.

An air bag and an inflator are typically assembled together as parts of an air bag module. In addition to the air bag and the inflator, the module includes a reaction canister which contains and supports the air bag and the inflator in the vehicle. The reaction canister has a deployment opening through which the air bag moves outward from the reaction canister when the air bag is inflating. A deployment door is fastened to the reaction canister, and extends over the deployment opening to conceal the air bag and the other parts of the module from the vehicle occupant compartment.

When the inflator is actuated, the reaction canister directs the inflation fluid to flow from the inflator into the air bag. As the inflation fluid enters the air bag, it moves the air bag outward through the deployment opening and forcefully against the deployment door. A rupturable portion of the deployment door is ruptured by the force of the fluid pressure in the air bag. A panel portion of the deployment door is then released for pivotal movement away from the deployment opening. As the air bag continues to move outward against the deployment door, it forcefully deflects a hinge portion of the deployment door so as to move the panel portion pivotally away from the deployment opening. The deployment door is thus opened and moved out of the path of the air bag as the air bag is inflated outward from the reaction canister through the deployment opening and into the vehicle occupant compartment.

SUMMARY OF THE INVENTION

In accordance with the present invention, an apparatus for use with an inflatable vehicle occupant restraint comprises a door panel and closure means for securing the door panel in a closed position. The closure means releases the door panel for pivotal movement to an opened position under the influence of the restraint when the restraint is being inflated.

The closure means includes a plurality of couplings which block pivotal movement of the door panel from the closed position to the opened position. Each coupling comprises a rigid member which ruptures a rupturable member upon relative movement of those members under the influence of the inflating restraint. The couplings are opened so as to release the door panel for pivotal movement from the closed position to the opened position upon such rupturing by the rigid members.

The couplings include first and second couplings. The first coupling is opened before the second coupling is opened. As a result, the door panel is released at the location of the first coupling before being released at the location of the second coupling.

In a preferred embodiment of the present invention, the apparatus further comprises a reaction canister for containing the restraint in a vehicle. The reaction canister defines a deployment opening through which the inflating restraint moves outward toward and against the door panel. Each coupling comprises a bolt which is fixed to the reaction canister. The bolts project from the reaction canister through a rupturable plastic flange on the door panel. The bolts are spaced from a free edge of the flange, with the bolt in the first coupling being closer to the free edge of the flange.

When the inflating restraint moves against the door panel, it applies a fluid pressure force to the door panel. The fluid pressure force is transmitted from the door panel to the flange. As a result, the flange is torn away from the bolts. The door panel is thus released from the reaction canister so that the inflating restraint can move the door panel pivotally from the closed position to the opened position.

When the flange is torn away from the bolts, tears are propagated through the plastic material of the flange between the bolts and the free edge of the flange. The flange is torn away from the first bolt before being torn away from the second bolt because the first bolt is closer to the free edge. Accordingly, the flange, and hence the door panel, is released from the reaction canister at the location of the first bolt before being released at the location of the second bolt.

In the preferred embodiments of the present invention, the door panel has a generally rectangular shape which is elongated horizontally. The flange extends along one side of the door panel between the opposite ends of the door panel, and extends across the middle of the door panel. The first coupling is located near the middle of the door panel. The second coupling is located between the first coupling and one end of the door panel. A third coupling, which opens substantially simultaneously with the second coupling, is located between the first coupling and the other end of the door panel. In this arrangement, the couplings first release the door panel from the reaction canister near the middle of the door panel, and subsequently release the door panel at locations closer to its opposite ends. This ensures that the air bag will inflate outward past the door panel and into the vehicle occupant compartment in a controlled configuration which, in the preferred embodiments of the present invention, is centered at the middle of the door panel.

BRIEF DESCRIPTION OF THE DRAWINGS

Further features of the present invention will become apparent to those skilled in the art to which the present invention relates from reading the following description with reference to the accompanying drawings, in which:

FIG. 5 is a bottom view of parts of the apparatus of FIG. 1;

FIG. 6 is a view taken on line 6—6 of FIG. 5;

DESCRIPTION OF PREFERRED EMBODIMENTS

Figure 1:
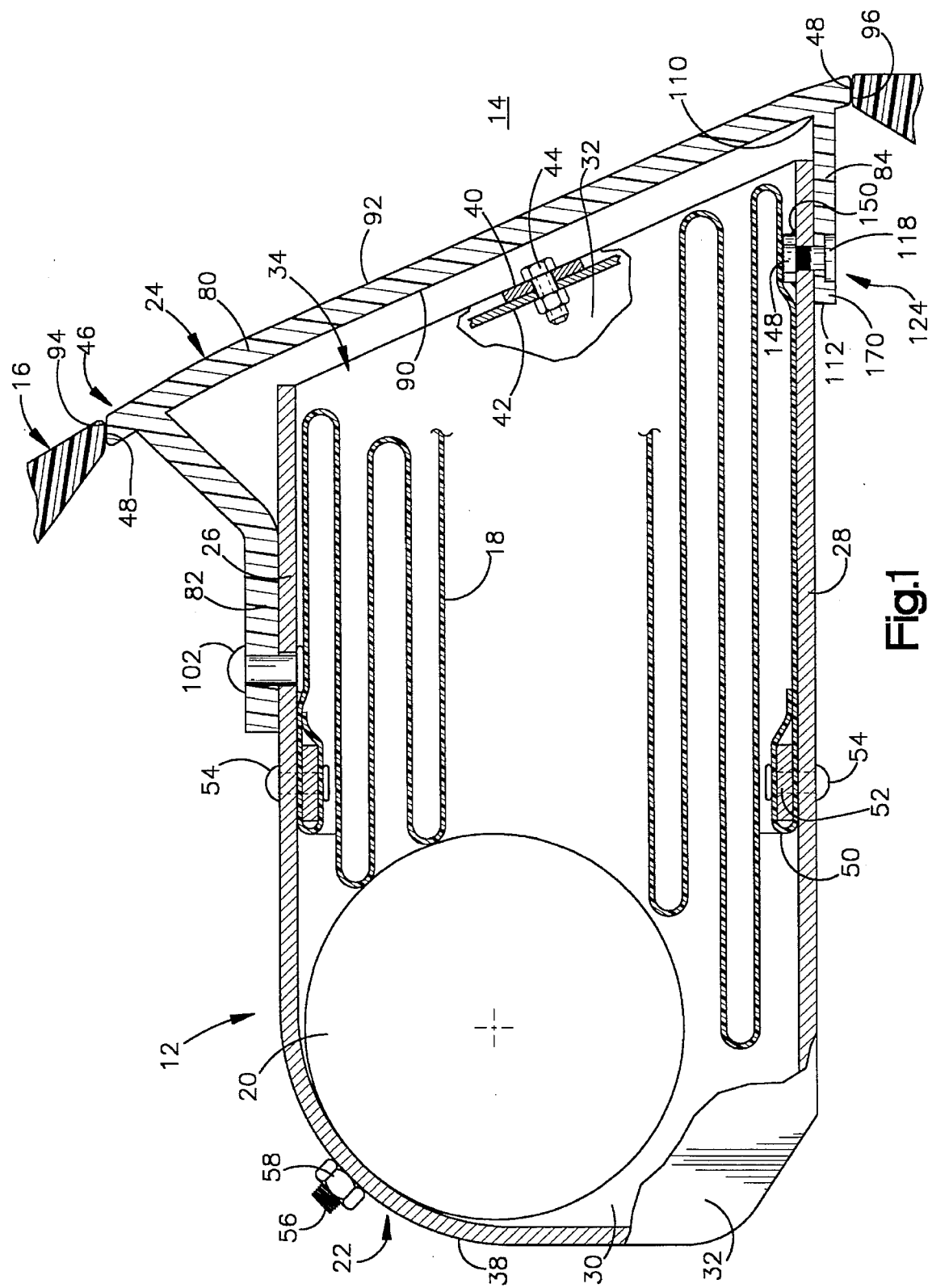
FIG. 1 is a schematic view of a vehicle occupant restraint apparatus comprising a first embodiment of the present invention.

As shown in FIG. 1, a vehicle occupant restraint apparatus 10 comprising a first embodiment of the present invention includes an air bag module 12. The air bag module 12 is mounted in a vehicle at a location adjacent to the vehicle occupant compartment 14, such as in the instrument panel 16 at the passenger side of the vehicle. The air bag module 12 includes a particular type of inflatable vehicle occupant restraint 18 which is commonly referred to as an air bag. The air bag module 12 also includes an inflator 20 which comprises a source of inflation fluid for inflating the air bag 18.

Figure 2:
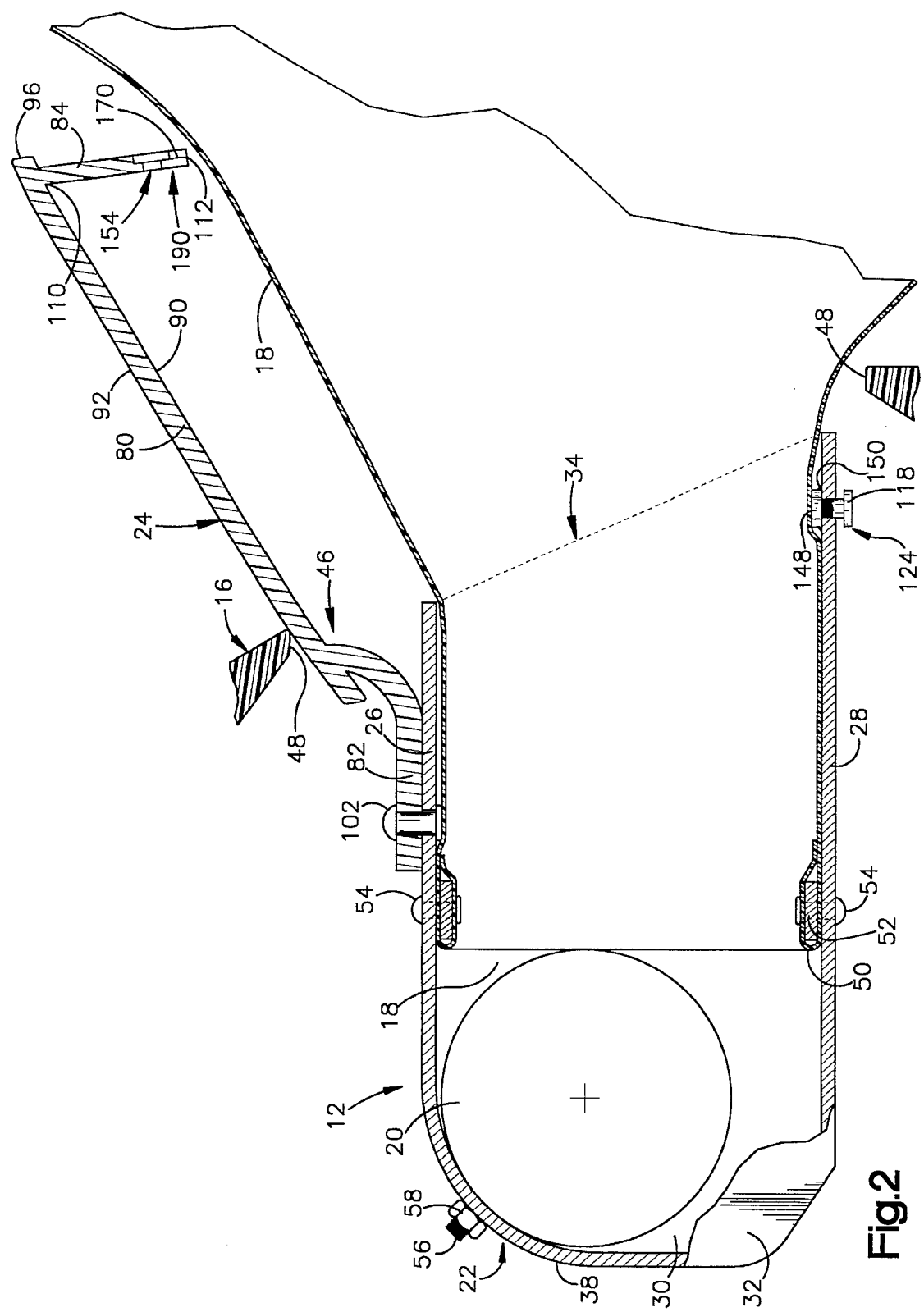
FIG. 2 is a view showing the apparatus of FIG. 1 in an actuated condition.

When the inflator 20 is actuated, it rapidly emits a large volume of inflation fluid which inflates the air bag 18 from an uninflated condition, as shown fully in FIG. 1, to an inflated condition, as shown partially in FIG. 2. When the air bag 18 is in the inflated condition, it extends from the instrument panel 16 into the vehicle occupant compartment 14. The air bag 18 then restrains movement of a vehicle occupant toward the instrument panel 16 to help protect the occupant from a forceful impact with the instrument panel 16 or other parts of the vehicle.

The air bag module 12 further includes a reaction canister 22 and a deployment door 24. The reaction canister 22 contains the air bag 18 and the inflator 20. The deployment door 24 is mounted on the reaction canister 22, and conceals the other parts of the air bag module 12 from the vehicle occupant compartment 14.

The reaction canister 22 has an upper wall 26, a lower wall 28, and a pair of opposite side walls 30 and 32. The upper, lower, and side walls 26, 28, 30 and 32 of the reaction canister 22 together define a deployment opening 34 at the outer end of the reaction canister 22. An inner wall 38 closes the inner end of the reaction canister 22 opposite the deployment opening 34.

A plurality of mounting tabs 40, one of which is shown in FIG. 1, project from the reaction canister 22. The mounting tabs 40 are fixed to corresponding supporting parts 42 of the instrument panel 16 by fasteners 44. The structure and arrangement of the fasteners 44, the mounting tabs 40, and the supporting parts 42 of the instrument panel 16 can vary, as known in the art. The reaction canister 22 is mounted in a position in which the deployment opening 34 is located within a larger opening 46 defined by a surrounding edge surface 48 of the instrument panel 16. Although the reaction canister 22 in the preferred embodiments of the present invention is a separate structure which is mounted in the instrument panel 16, such a canister could alternatively be defined by the structure of the instrument panel 16, or by another part of the vehicle from which the air bag 18 or other inflatable vehicle occupant restraint is to be inflated into the vehicle occupant compartment 14.

As noted above, the air bag 18 is contained in the reaction canister 22 in the uninflated condition of FIG. 1. An open inner end portion 50 of the air bag 18 is wrapped around and secured to a retainer ring 52 in a known manner. The retainer ring 52 extends fully around the inside of the reaction canister 22 at a location between the inflator 20 and the deployment opening 34. A plurality of fasteners 54 securely fasten the retainer ring 52 and the air bag 18 to the surrounding walls 26, 28, 30 and 32 of the reaction canister 22 at that location.

The inflator 20 may contain an ignitable gas generating material which, when ignited, rapidly generates a large volume of gas. The inflator 20 may alternatively contain a stored quantity of pressurized inflation fluid, or a combination of pressurized inflation fluid and ignitable material for heating the inflation fluid. As indicated in FIG. 1, the inflator 20 is a cylindrical structure extending longitudinally between the opposite side walls 30 and 32 of the reaction canister 22. A threaded mounting stud 56 on the inflator 20 projects radially outward through an opening (not shown) in the inner wall 38 of the reaction canister 22. A nut 58 on the mounting stud 56 attaches the inflator 20 securely to the reaction canister 22. Alternatively, the inflator 20 could be mounted in the reaction canister 22 by any other suitable mounting structure known in the art.

Figure 3:
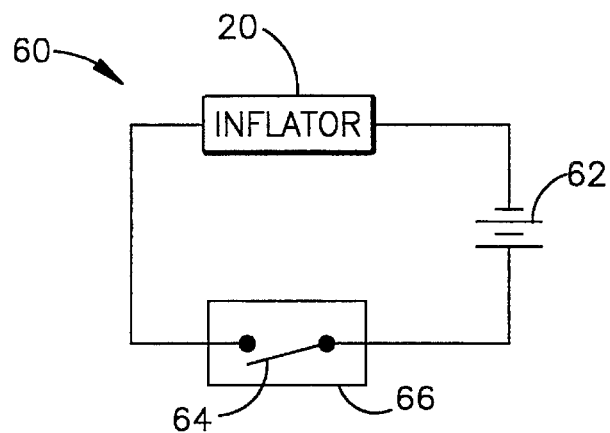
FIG. 3 is a schematic view of an electrical circuit including a part of the apparatus of FIG. 1.

As shown in FIG. 3, the inflator 20 is included in an electrical circuit 60. The electrical circuit 60 further includes a power source 62, which is preferably the vehicle battery and/or a capacitor, and a normally open switch 64. The switch 64 is part of a sensor 66 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 18 is desired to protect an occupant of the vehicle. The sensor 66 then closes the switch 64, and the inflator 20 is actuated electrically.

When the inflator 20 is actuated, it emits the inflation fluid into the reaction canister 22. The reaction canister 22 directs the inflation fluid from the inflator 20 into the air bag 18 to inflate the air bag 18 from the uninflated condition of FIG. 1 to the inflated condition of FIG. 2. As the inflation fluid begins to inflate the air bag 18, it moves the air bag 18 outward from the reaction canister 22 through the deployment opening 34 and forcefully against the deployment door 24. The air bag 18 then deflects the deployment door 24 from a closed configuration, as shown in FIG. 1, to an opened configuration, as shown in FIG. 2. As the air bag 18 opens the deployment door 24, it moves outward into the vehicle occupant compartment 14 past the deployment door 24.

As shown in FIG. 1, the deployment door 24 is a unitary plastic part with a plurality of distinct portions including a door panel 80, an upper flange 82, and a lower flange 84. The door panel 80 has oppositely facing inner and outer side surfaces 90 and 92. When the door panel 80 is in the closed position of FIG. 1, the inner side surface 90 faces inward toward the reaction canister 22, and the outer side surface 92 faces outward toward the vehicle occupant compartment 14.

Figure 4:
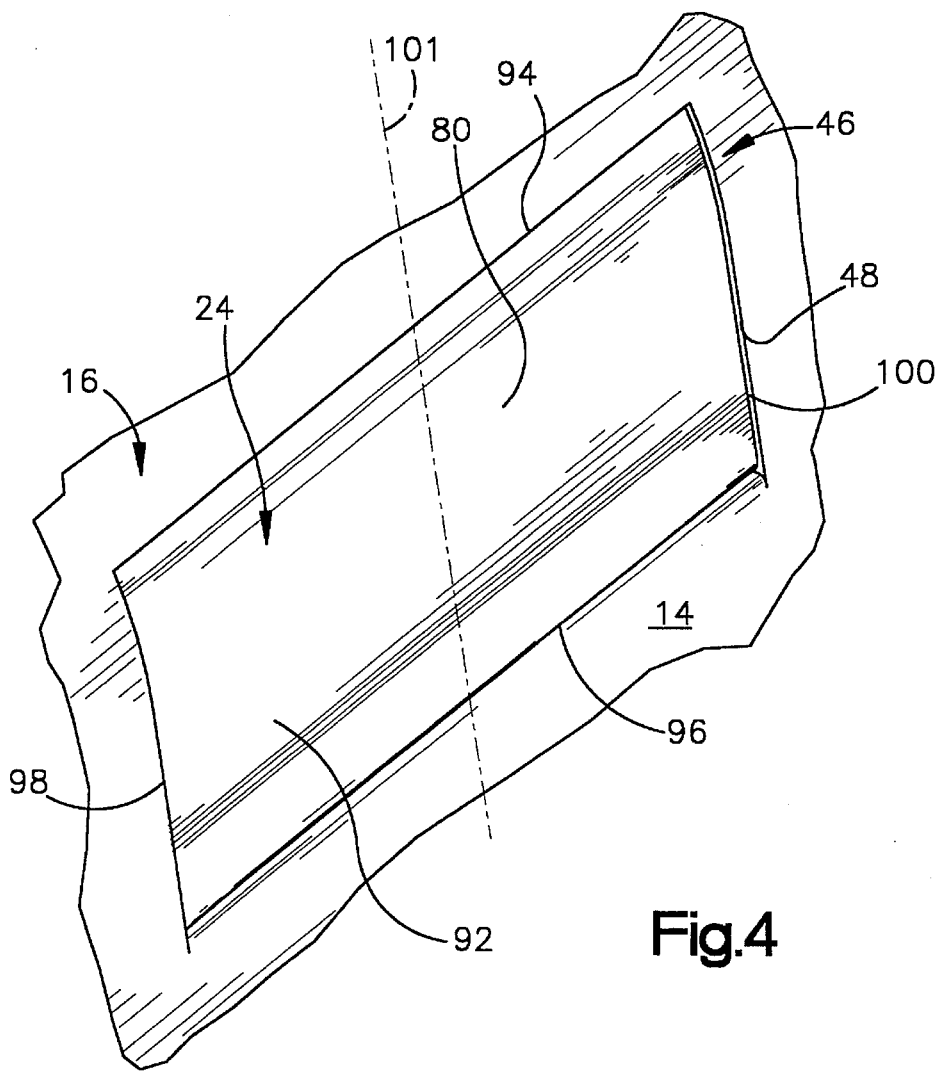
FIG. 4 is a perspective view of parts of the apparatus of FIG. 1.

As shown in FIG. 4, the door panel 80 has a generally rectangular peripheral shape which is elongated horizontally. A pair of upper and lower side edges 94 and 96 of the door panel 80 extend along its length between a pair of opposite end edges 98 and 100. A transverse centerline 101 of the door panel 80 bisects the upper and lower side edges 94 and 96. The peripheral edges 94, 96, 98 and 100 of the door panel 80 together follow the contour of the edge surface 48 of the instrument panel 16. The door panel 80 thus extends fully across the opening 46 in the instrument panel 16 when in the closed position, with the outer side surface 92 continuing the trim theme of the instrument panel 16 across the opening 46.

The upper flange 82 on the deployment door 24 projects inward from the door panel 80 near the upper side edge 94 of the door panel 80. A plurality of rigid fasteners 102, one of which is shown in FIG. 1, fasten the upper flange 82 to the upper wall 26 of the reaction canister 22. When the air bag 18 is inflated, the upper flange 82 acts as a flexible hinge for pivotal movement of the door panel 80.

The lower flange 84 on the deployment door 24 projects inward from the door panel 80 near the lower side edge 96 of the door panel 80. As shown from beneath in FIG. 5, the lower flange 84 has a rectangular peripheral shape, with a pair of opposite side edges 110 and 112 extending along its length between a pair of opposite end edges 114 and 116. The first side edge 110 extends alongside the door panel 80, and adjoins the inner side surface 90 of the door panel 80. The second side edge 112 is a free edge which is spaced from the door panel 80.

Like the upper flange 82, the lower flange 84 is fastened to the reaction canister 22 by a plurality of rigid fasteners. Although the number of such fasteners could vary, in the first embodiment of the present invention shown in FIGS. 1–9, there are three such fasteners 118, 120 and 122. The lower flange 84 and the three fasteners 118, 120 and 122 together define three couplings 124, 126 and 128 (FIG. 5) for securing the lower flange 84 to the lower wall 28 of the reaction canister 22. The couplings 124, 126 and 128 thus secure the door panel 80 to the reaction canister 22 in the closed position of FIG. 1. In accordance with the present invention, each of the couplings 124, 126 and 128 is opened in a controlled manner upon inflation of the air bag 18 so as to release the lower flange 84, and hence the door panel 80, for movement from the closed position of FIG. 1 to the opened position of FIG. 2 under the influence of the inflating air bag 18.

Although any suitable rivets, bolts, machine screws, or the like can be used in accordance with the present invention, each of the fasteners 118, 120 and 122 in the first embodiments of the present invention is a bolt. The bolts 118, 120, and 122 are arranged in a row extending alongside the door panel 80. The first bolt 118 is located adjacent to the transverse centerline 101 of the door panel 80. The second and third bolts 120 and 122 are equally spaced from the first bolt 118 on respective opposite sides of the transverse centerline 101.

As further shown in FIGS. 5 and 6, the three bolts 118, 120 and 122 are alike. Each one has a cylindrical neck 140 and a cylindrical head 142 with a driving recess 144. The bolts 118, 120 and 122 extend upward through the lower flange 84 on the deployment door 24, upward through the lower wall 28 of the reaction canister 22, and further upward into a corresponding plurality of nuts 148. The nuts 148 are fixed to the lower wall 28 of the reaction canister 22 by welds 150.

Figure 7:
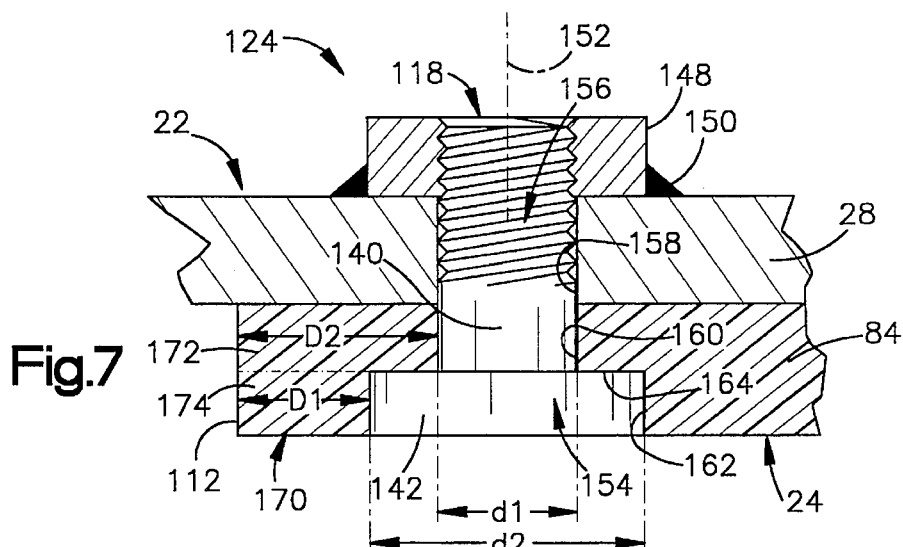
FIG. 7 is a view taken on line 7—7 of FIG. 6.

As shown in greater detail in FIG. 7, the first bolt 118 has a central axis 152, and extends closely through a pair of aligned apertures 154 and 156 in the lower flange 84 and the lower wall 28, respectively. The aperture 156 in the lower wall 28 is defined by a cylindrical inner surface 158 of the lower wall 28. The cylindrical inner surface 158 has a first diameter d1 which is equal to the diameter of the neck 140 on the bolt 118.

The aperture 154 in the lower flange 84 is defined by first and second cylindrical inner surfaces 160 and 162 of the lower flange 84. The first cylindrical inner surface 160 has the first diameter d1. The second cylindrical inner surface 162 has a second, greater diameter d2 which is equal to the diameter of the head 142 on the bolt 118. An annular shoulder surface 164 of the lower flange 84 extends circumferentially around the axis 152 between the first and second cylindrical inner surfaces 160 and 162. In this arrangement, the bolt 118 is countersunk in the aperture 154, with the head 142 adjoining the surfaces 162 and 164, and with the neck 140 adjoining the surface 160.

As further shown in FIG. 7, the first coupling 124 defines a first rupturable portion 170 of the lower flange 84. The first rupturable portion 170 comprises the plastic material of the lower flange 84 which is located between the bolt 118 and the free edge 112. Specifically, the first rupturable portion 170 has upper and lower sections 172 and 174. The lower section 174 extends a first distance D1 from the head 142 of the bolt 118 to the free edge 112. The upper section 172 extends a second, greater distance D2 from the neck 140 of the bolt 118 to the free edge 112.

The second and third bolts 120 and 122 are both countersunk in the lower flange 84 in the same manner as described above with reference to the first bolt 118. Therefore, the second and third couplings 126 and 128 define second and third rupturable portions 180 and 182 (FIG. 5) of the lower flange 84, respectively, in the same manner as described above with reference to the first coupling 124 and the first rupturable portion 170. However, as shown in FIG. 5, the heads 142 on the second and third bolts 120 and 122 are equally spaced a distance D3 from the free edge 112 of the lower flange 84. The distance D3 is substantially greater than the distance D1. As a result, the second and third rupturable portions 180 and 182 of the lower flange 84 comprise correspondingly greater amounts of the plastic material, as compared with the amount of plastic material at the first rupturable portion 170, and have correspondingly greater resistances to being fully ruptured.

As described above, the air bag 18 moves outward against the deployment door 24 when the air bag 18 is being inflated from the condition of FIG. 1 toward the condition of FIG. 2. The inflation fluid in the air bag 18 then causes the air bag 18 to apply a fluid pressure force against the inner side surface 90 of the door panel 80. Some components of the fluid pressure force are transmitted from the door panel 80 to the upper flange 82. The plastic material of the deployment door 24 at the upper flange 82 is thick enough to resist being ruptured by the force components transmitted to the upper flange 82. Other components of the fluid pressure force are transmitted from the door panel 80 to the lower flange 84. In accordance with the present invention, the lower flange 84 is ruptured by those force components in a controlled manner at each of the three couplings 124, 126, and 128.

Figure 8:
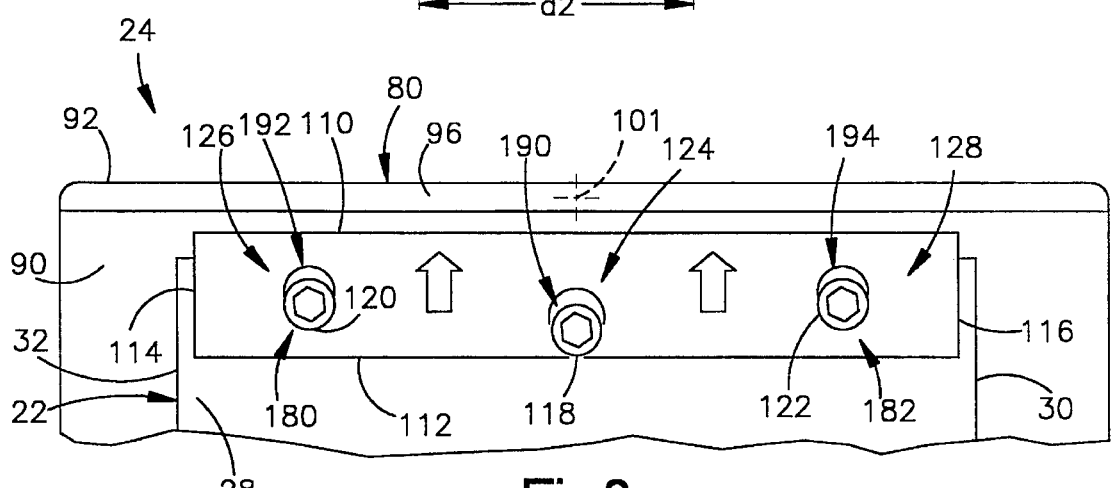
FIGS. 8 and 9 are views showing the parts of FIG. 5 in different positions.
Figure 9:
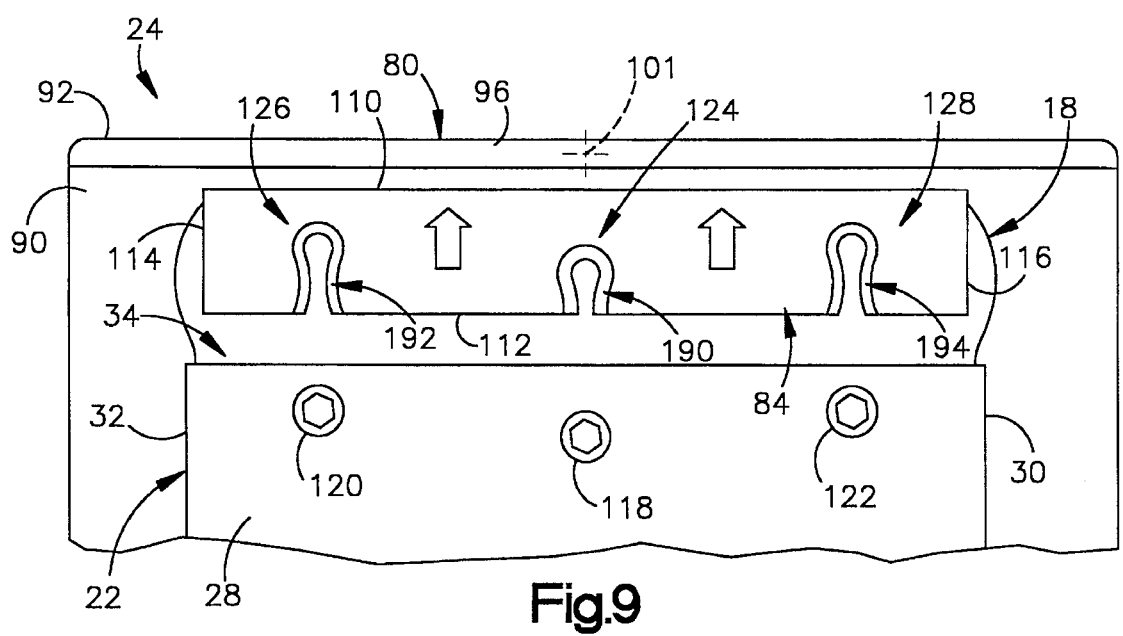

Specifically, as indicated by the arrows shown in FIGS. 8 and 9, the fluid pressure force applied to the door panel 80 by the inflating air bag 18 causes the lower flange 84 to be pulled forcefully outward from the lower wall 28 of the reaction canister 22. The free edge 112 of the lower flange 84 is then pulled forcefully outward toward the bolts 118, 120, and 122. Such relative movement of the bolts 118, 120, and 122 toward the free edge 112 causes them to tear through the rupturable portions 170, 180, and 182, respectively, of the lower flange 84 in directions toward the free edge 112. In this manner, three corresponding tears 190, 192, and 194 are propagated through the rupturable portions 170, 180, and 182 of the lower flange 84 in directions extending inward toward the free edge 112.

All three of the couplings 124, 126, and 128 are opened when all three of the bolts 118, 120, and 122 have torn fully through the respective rupturable portions 170, 180, and 182 of the lower flange 84. The lower flange 84 and the door panel 80 are then fully released from the lower wall 28 of the reaction canister 22. As indicated in FIG. 8, the first coupling 124 is opened before the second and third couplings 126 and 128 are opened. This is because the first bolt 118 is closest to the free edge 112, and consequently tears through the least amount of the plastic material at the lower flange 84. The second and third couplings 126 and 128 are opened substantially simultaneously at a predetermined time after the first coupling 124 is opened. This is because the second and third bolts 120 and 122 are equally spaced a greater distance from the free edge 112, and tear through correspondingly greater amounts of the plastic material.

In accordance with the foregoing feature of the present invention, the door panel 80 is first released from the lower wall 28 of the reaction canister 22 at the location of the first coupling 124, i.e., adjacent to the transverse centerline 101. The door panel 80 is subsequently released at the locations of the second and third couplings 124 and 126, i.e., at locations closer to the opposite end edges 94 and 96 of the door panel 80. Therefore, the inflating air bag 18 moves outward past the door panel 80 and into the vehicle occupant compartment 14 in a controlled configuration which is centered relative to the length of the door panel 80.

Several different parameters affect the manner in which the deployment door 80 is released from the reaction canister 22 in accordance with the present invention. Such parameters include, for example, the number of the couplings 124, 126, and 128, the diameters d1 and d2, and the distances D1, D2, and D3. These are all variables that affect the amount of the plastic material which is to be ruptured, and consequently the resistance to such rupturing, at each of the couplings 124, 126, and 128. The composition of the plastic material and the thickness of the lower flange 84 also affect the resistance to rupturing of the plastic material at the couplings 124, 126, and 128. Accordingly, the predetermined times at which the couplings 124, 126, and 128 are opened can be varied in a controlled manner by varying any one or more of these parameters.

A second embodiment of the present invention is shown in FIGS. 10–13. In the second embodiment, a deployment door 200 has a door panel 202 and a lower flange 204 projecting inward from the door panel 202. Like the lower flange 84 described above, the lower flange 204 is formed of a rupturable plastic material, and has a free edge 206 spaced from the door panel 202. The lower flange 204 and the door panel 202 are secured to a lower wall 208 of a reaction canister 210 by three releasable couplings 212, 214, and 216.

Figure 11:
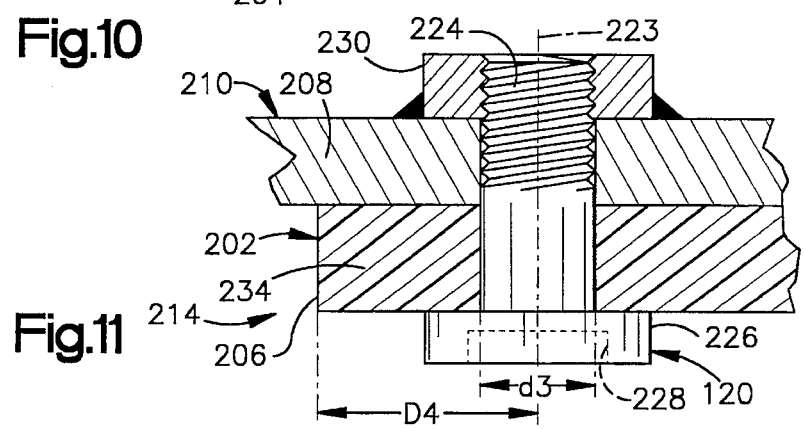
FIG. 11 is a view taken on line 11—11 of FIG. 10.
Figure 12:
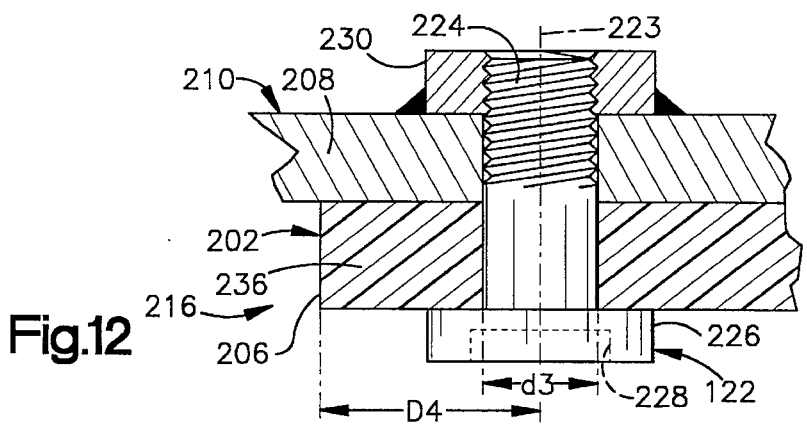
FIG. 12 is a view taken on line 12—12 of FIG. 10.
Figure 13:
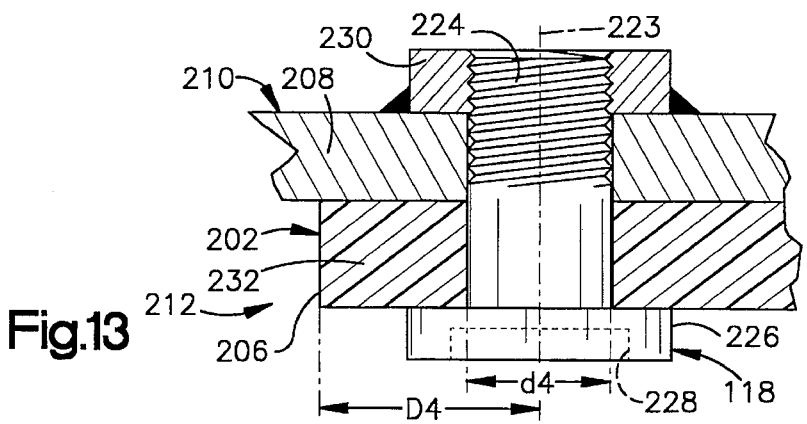
FIG. 13 is a view taken on line 13—13 of FIG. 10.

The three couplings 212, 214, and 216 include three bolts 218, 220, and 222, respectively. As best shown in FIGS. 11–13, each of the bolts 218, 220, and 222 has a central axis 223, a cylindrical neck 224, and a head 226 with a driving recess 228. The bolts 218, 220, and 222 extend upward through the lower flange 204, upward through the lower wall 208 of the reaction canister 210, and further upward into a corresponding plurality of nuts 230 which are welded to the lower wall 208 of the reaction canister 210. However, unlike the bolts 118, 120, and 122 at the lower flange 84 described above, the bolts 218, 220, and 222 are not countersunk in the lower flange 204. Instead, each neck 224 extends fully and closely through the lower flange 204. The bolts 218, 220, and 222 define three corresponding rupturable portions 232, 234, and 236 of the lower flange 204 which extend fully between the necks 224 and the free edge 206.

Figure 10:
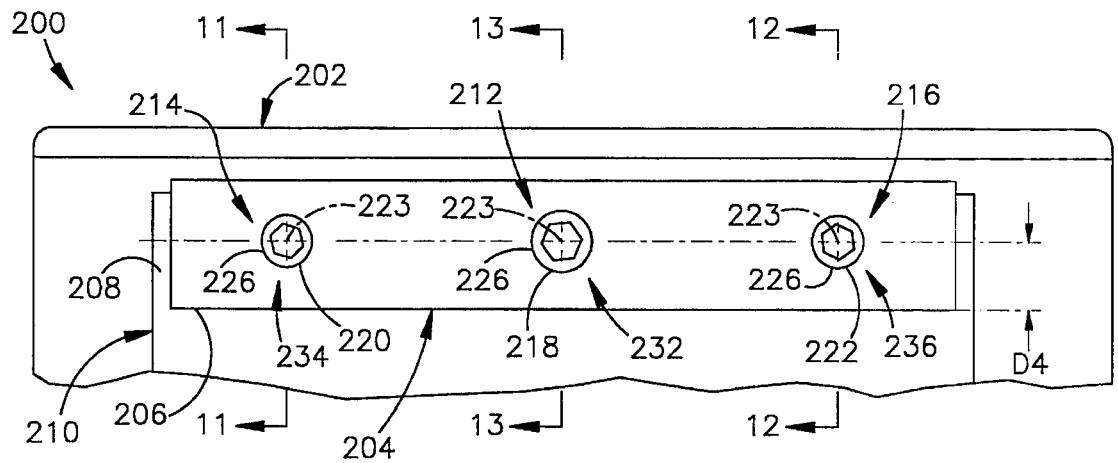
FIG. 10 is a bottom view similar to FIG. 5 showing parts of a vehicle occupant restraint apparatus comprising a second embodiment of the present invention.

As shown in FIG. 10, the bolts 218, 220, and 222 are arranged in a row with their central axes 223 equally spaced a distance D4 from the free edge 206 of the lower flange 204. However, the necks 224 on the second and third bolts 220 and 222 have equal diameters d3 (FIGS. 11 and 12) which are substantially less than the diameter d4 (FIG. 13) of the neck 224 on the first bolt 218. Therefore, the second and third rupturable portions 234 and 236 of the lower flange 204 comprise correspondingly greater amounts of the plastic material of which the lower flange 204 is formed, as compared with the amount of plastic material at the first rupturable portion 232.

Like the three couplings 124, 126, and 128 described above, the three couplings 212, 214, and 216 are opened when an air bag in the reaction canister 218 is inflated forcefully outward against the door panel 202 so as to tear the lower flange 204 away from the bolts 218, 220, and 222. As in the first embodiment of the present invention, the first coupling 212 in the second embodiment of the present invention is opened before the other couplings 214 and 216 are opened. This is because the first rupturable portion 232 of the lower flange 204 comprises a lesser amount of the plastic material, as compared with the amounts at the other rupturable portions 234 and 236, and consequently has a lesser resistance to being fully ruptured.

The present invention has been described with reference to preferred embodiments. From the foregoing description of the invention, those skilled in the art will perceive improvements, changes and modifications. For example, the releasable couplings could have a different opening sequence and/or different locations relative to the length or other dimension of the door panel. Such differences could be designed for inflation of the air bag in a controlled configuration other than one that is centered relative to the length of the door panel. Additionally, the couplings described above begin to rupture at substantially the same time, but finish rupturing at different times because they have different resistances to being fully ruptured. Alternatively, couplings of equal resistance could begin to rupture at different times to achieve the same result in accordance with the present invention. The present invention is also applicable to deployment doors that have a different size, shape, or location on the instrument panel. Moreover, a vehicle occupant restraint system may include one or more air bags that inflate upon the occurrence of front, rear, and/or side impacts to the vehicle. The air bags can be mounted in parts of the vehicle other than the instrument panel. Such other parts of the vehicle include, for example, the steering column, the doors, the pillars, the roof, and the seats. A closure structure constructed in accordance with the present invention could be used with a deployment door at any of those locations. Such improvements, changes and modifications within the skill of the art are intended to be covered by the appended claims.

Having described the invention, the following is claimed:

1. Apparatus for use with an inflatable vehicle occupant restraint, said apparatus comprising:

a door panel; and closure means for securing said door panel in a closed position, said closure means releasing said door panel for pivotal movement to an opened position under the influence of the restraint upon inflation of the restraint;

said closure means including a plurality of couplings which block said pivotal movement of said door panel, each of said couplings comprising a rigid member which ruptures a rupturable member upon relative movement of said members under the influence of the inflating restraint, said couplings being opened so as to release said door panel for said pivotal movement upon said rupturing by said rigid members;

said couplings including a first coupling at a first location and a second coupling at a second location, said first coupling being opened before said second coupling is opened, whereby said door panel is released at said first location before being released at said second location.

2. Apparatus as defined in claim 1 wherein said couplings are arranged in a row extending alongside said door panel, said first and second couplings having adjacent positions in said row.

3. Apparatus as defined in claim 2 wherein said couplings further include a third coupling which is opened substantially simultaneously with said second coupling, said first coupling being located between said second and third couplings.

4. Apparatus as defined in claim 3 wherein said door panel has a generally rectangular shape with a transverse centerline, said first coupling being located adjacent to said transverse centerline, said second and third couplings being located on respective opposite sides of said transverse centerline.

5. Apparatus as defined in claim 4 wherein said second and third couplings are equally spaced from said first coupling.

6. Apparatus as defined in claim 1 wherein said first coupling has a first resistance to being opened under the influence of the inflating restraint, said second coupling having a second, greater resistance to being opened under the influence of the inflating restraint.

7. Apparatus as defined in claim 6 wherein said rupturing begins substantially simultaneously at said first and second couplings.

8. Apparatus as defined in claim 1 wherein said first coupling is opened upon tearing of a rigid metal member through a first amount of a rupturable plastic member, said second coupling being opened upon tearing of a rigid metal member through a second, greater amount of a rupturable plastic member.

9. Apparatus as defined in claim 8 wherein said closure means comprises a single rupturable plastic member, said first and second couplings being opened upon tearing of said rigid metal members through said single rupturable plastic member.

10. Apparatus as defined in claim 9 wherein said rigid metal members begin to tear through said single rupturable plastic member substantially simultaneously.

11. Apparatus for use with an inflatable vehicle occupant restraint, said apparatus comprising:

canister means for containing and supporting the restraint in a vehicle, said canister means defining a deployment opening through which the restraint moves outward when inflating;

a deployment door including a door panel extending across said deployment opening, hinge means on one side of said deployment opening, and a flange on an opposite side of said deployment opening, said hinge means supporting said door panel and said flange for pivotal movement outward from said deployment opening under the influence of the inflating restraint; and closure means for securing said flange to said canister means, said closure means releasing said flange from said canister means under the influence of the inflating restraint;

said closure means comprising first and second closure members which fully rupture respective first and second portions of said flange upon said pivotal movement of said flange, said first portion of said flange having a first resistance to being fully ruptured, said second portion of said flange having a second, greater resistance to being fully ruptured, whereby said first portion of said flange is fully ruptured before said second portion of said flange is fully ruptured.

12. Apparatus as defined in claim 11 wherein said first and second closure members project from said canister means through said flange at locations between said door panel and a free edge of said flange, said first portion of said flange extending a first distance from said first closure member to said free edge of said flange, said second portion of said flange extending a second, greater distance from said second closure member to said free edge of said flange.

13. Apparatus as defined in claim 12 wherein said first and second closure members comprise cylindrical parts with central axes and equal diameters, said central axes being unequally spaced from said free edge of said flange.

14. Apparatus as defined in claim 12 wherein said first and second closure comprise cylindrical parts with central axes and unequal diameters, said central axes being spaced equal distances from said free edge of said flange.

15. Apparatus as defined in claim 11 wherein said closure means further comprises a third closure member which fully ruptures a third portion of said flange upon said pivotal movement of said flange, said third portion of said flange having said second resistance to being fully ruptured, whereby said third portion of said flange is fully ruptured substantially simultaneously with said second portion of said flange.

16. Apparatus as defined in claim 15 wherein said door panel has a peripheral shape and a centerline which bisects said peripheral shape, said first closure member being located adjacent to said centerline, said second and third closure members being located on respective opposite sides of said centerline.

17. Apparatus as defined in claim 16 wherein said second and third closure members are equally spaced from said first closure member.

18. Apparatus as defined in claim 11 wherein each of said closure members comprises a bolt with a threaded shaft and a head having a driving recess.

* * * * *